United States Patent [19]
Hitchock

[11] Patent Number: 5,829,153
[45] Date of Patent: Nov. 3, 1998

[54] LOCKABLE CAP ASSEMBLY

[75] Inventor: Robert S. Hitchock, Lake Providence, La.

[73] Assignee: Moeller Products Co., Inc., Greenville, Miss.

[21] Appl. No.: 779,388

[22] Filed: Jan. 7, 1997

[51] Int. Cl.$^6$ ........................................... G01F 23/04
[52] U.S. Cl. ........................ 33/728; 33/722; 33/731; 116/227
[58] Field of Search ............................... 33/728, 719, 722, 33/730, 731; 116/227

[56] References Cited

U.S. PATENT DOCUMENTS

| | | |
|---|---|---|
| D. 105,723 | 8/1937 | Wheaton . |
| D. 201,327 | 6/1965 | Hori et al. . |
| D. 205,975 | 10/1966 | Sato . |
| D. 250,467 | 12/1978 | O'Banion . |
| D. 250,468 | 12/1978 | O'Banion . |
| D. 259,489 | 6/1981 | Herenius . |
| D. 274,620 | 7/1984 | Murakami et al. . |
| D. 305,028 | 12/1989 | Sherwood et al. . |
| D. 320,562 | 10/1991 | Brester et al. . |
| D. 348,645 | 7/1994 | Hitchock et al. . |
| 3,371,418 | 3/1968 | Moeller . |
| 3,703,038 | 11/1972 | Smith . |
| 3,913,783 | 10/1975 | Cooper . |
| 3,927,783 | 12/1975 | Bogert . |
| 4,113,138 | 9/1978 | Fields et al. . |
| 4,168,011 | 9/1979 | Lomer . |
| 4,331,185 | 5/1982 | Rinaldo et al. . |
| 4,516,688 | 5/1985 | Freeland . |
| 4,531,293 | 7/1985 | Grinde . |
| 4,717,119 | 1/1988 | Trin . |
| 4,965,942 | 10/1990 | Hoszowski . |
| 4,991,436 | 2/1991 | Roling . |
| 5,022,495 | 6/1991 | Lavender . |
| 5,086,943 | 2/1992 | Poskie . |
| 5,325,981 | 7/1994 | Klomhaus et al. ................. 33/728 |
| 5,466,020 | 11/1995 | Page et al. . |
| 5,485,681 | 1/1996 | Hitchock ......................... 33/722 |

FOREIGN PATENT DOCUMENTS

| | | | |
|---|---|---|---|
| 771315 | 10/1934 | France | ....................... 33/722 |

Primary Examiner—Christopher W. Fulton
Attorney, Agent, or Firm—Dickinson Wright

[57] ABSTRACT

A cap assembly, having a fixedly attached dipstick, for a fill and/or guide tube is provided. The cap provides a fluid tight seal on the end of the tube, thereby preventing fluid leakage. The cap can be used on both linear and non-linear tubes because it requires about 45° or less rotation to lock. The cap assembly comprises a housing for attachment on the open end of the tube. The housing is equipped with protruding lugs that interlock with grooves on the cap to form a fluid tight seal.

9 Claims, 2 Drawing Sheets

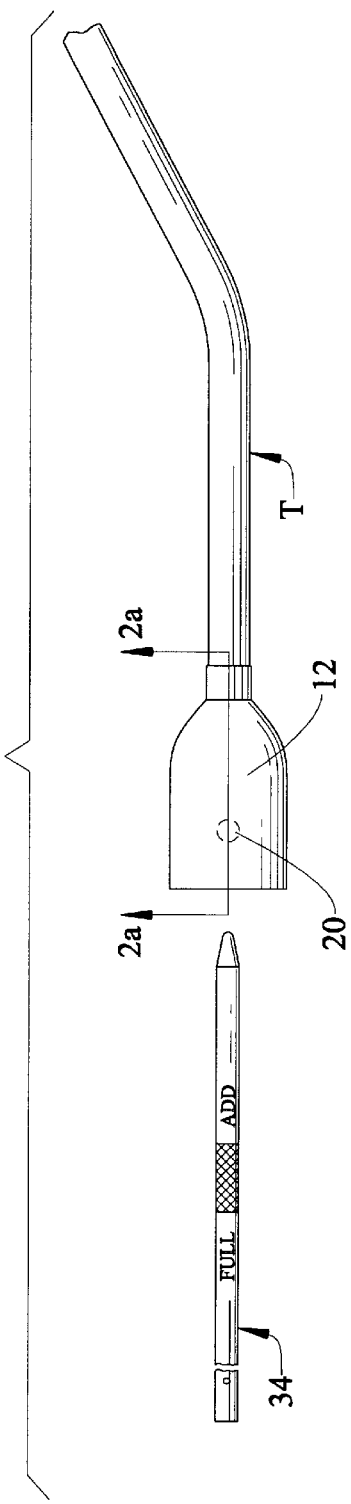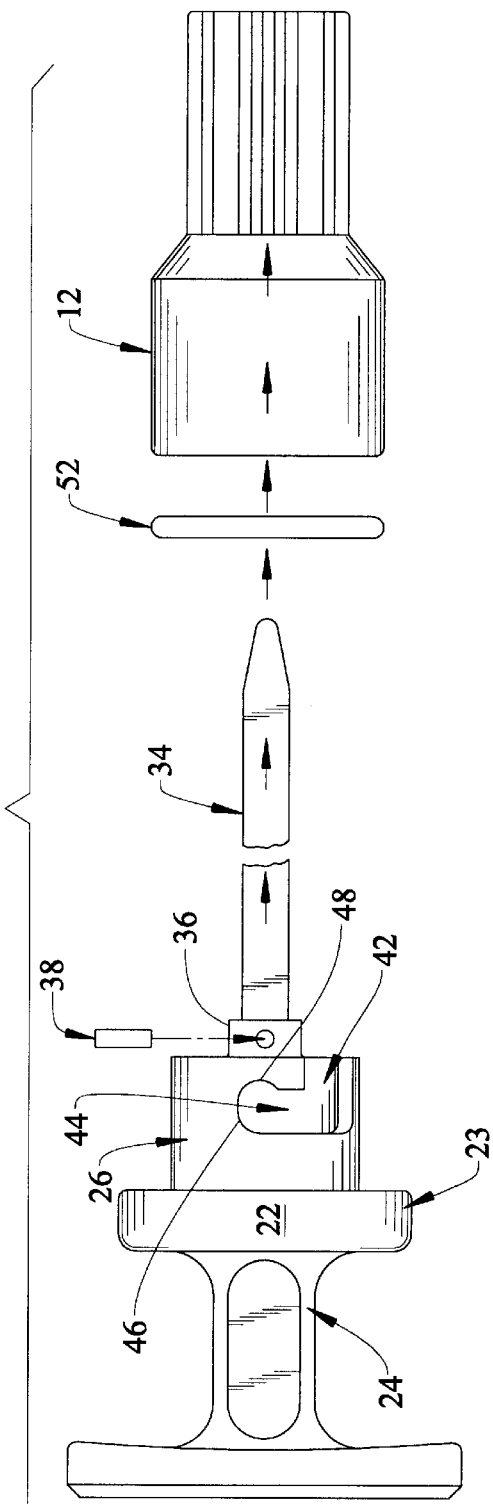

LOCKABLE CAP ASSEMBLY

FIELD OF THE INVENTION

This invention relates to a cap, with a dipstick, for fill and/or guide tubes on fluid reservoirs. More particularly, the invention relates to a locking and sealing reservoir cap having a dipstick rigidly affixed thereto for sealing the open end of a fill and/or guide tube extending from a fluid reservoir against a positive pressure.

BACKGROUND OF THE INVENTION

Several types of dipsticks are known to the art. All of these dipsticks provide a manual means for monitoring fluid levels in engines. However, the means by which the dipstick cap is secured to the fill tube, and the design of the dipstick blade, vary considerably. For example, U.S. Pat. No. 3,703,038 (Smith) discloses an oil dipstick with a wiper housing. The rod rotates within the wiper housing so that the fluid residue will not be accidentally wiped from the fluid level indicia on the rod when the rod is removed from the fill tube. U.S. Pat. No. 5,022,495 (Lavender) discloses a dipstick with an s-shaped blade. The cap of the dipstick is equipped with flanges so that it locks into place when it is turned. U.S. Pat. No. 5,086,943 (Poskie) discloses a dipstick useful for monitoring the level of transmission fluid. The dipstick has a screw-on cap which is fitted with an O-ring to perfect the seal of the cap. The blade of the dipstick is molded to the cap and has a series of horizontal and vertical indicia. U.S. Pat. No. 5,485,681 (Hitchcock) discloses a screw-on cap having a swivel mounted dipstick useful for non-linear fill and/or guide tubes.

In many modern engines, there may be by design a significant positive pressure in a fluid reservoir, for instance the crankcase, during operation. Therefore, it is critically important to provide a cap that securely locks and seals tight on the fill and/or guide tube to withstand this pressure and prevent fluid leakage. In these applications, screw-on caps are usually employed to effect a tight seal. However, many of the more complex modern engines are crowded in the vicinity of the fluid reservoir, and therefore require non-linear fill and/or guide tubes. To date, it has not been possible to use conventional dipstick designs and screw-on caps with non-linear fill and/or guide tubes, since the blade of the dipstick, when bent, is pressed against the side of the tube as the cap is turned, thereby arresting its movement. This problem was recognized, for example, in U.S. Pat. No. 5,485,681 and was overcome by swivel mounting the dipstick on a screw-on cap. Although, this swivel mounted dipstick works well, there may be applications where the additional expense of the swivel assembly is not warranted.

It is therefore an object of the present invention to provide an inexpensive, easy to use, improved dipstick with a tight sealing cap that is capable of being used with non-linear fill and/or guide tubes.

It is another object of the present invention to provide a tight sealing cap with a fixedly attached dipstick that is capable of being used with non-linear fill and/or guide tubes.

It is still a further object of the present invention to provide a cap, with a fixedly attached dipstick, that tightly seals and locks on a fill and/or guide tube with about 45° rotation or less.

It is still another object of the present invention to provide a tight sealing cap and housing assembly for attaching to the open end of a fill and/or guide tube wherein the locking mechanism is enclosed within the housing which prevents debris from being drawn into the tube when the cap is removed.

SUMMARY OF THE INVENTION

The present invention is a removable cap assembly having a fixedly attached dipstick that tightly seals and locks on the open end of a fill and/or guide tube. The assembly has a locking mechanism that locks and seals with about a 45° rotation or less. The assembly comprises a cap having a fixedly attached, non-swiveling, dipstick extending therefrom and a housing having an opening extending therethrough. The housing securely attaches to the end of the fill and/or guide tube and releasably, interlockingly engages the cap to enclose the open end of the fill and/or guide tube with a substantially fluid tight seal.

BRIEF DESCRIPTION OF THE DRAWINGS

FIG. 2 is a side view of the housing of the cap assembly of FIG. 1 attached to a non-linear fill and guide tube.

FIG. 4 is an exploded side view of the cap assembly of FIG. 1.

DESCRIPTION OF THE ILLUSTRATED EMBODIMENT

Figure 1:
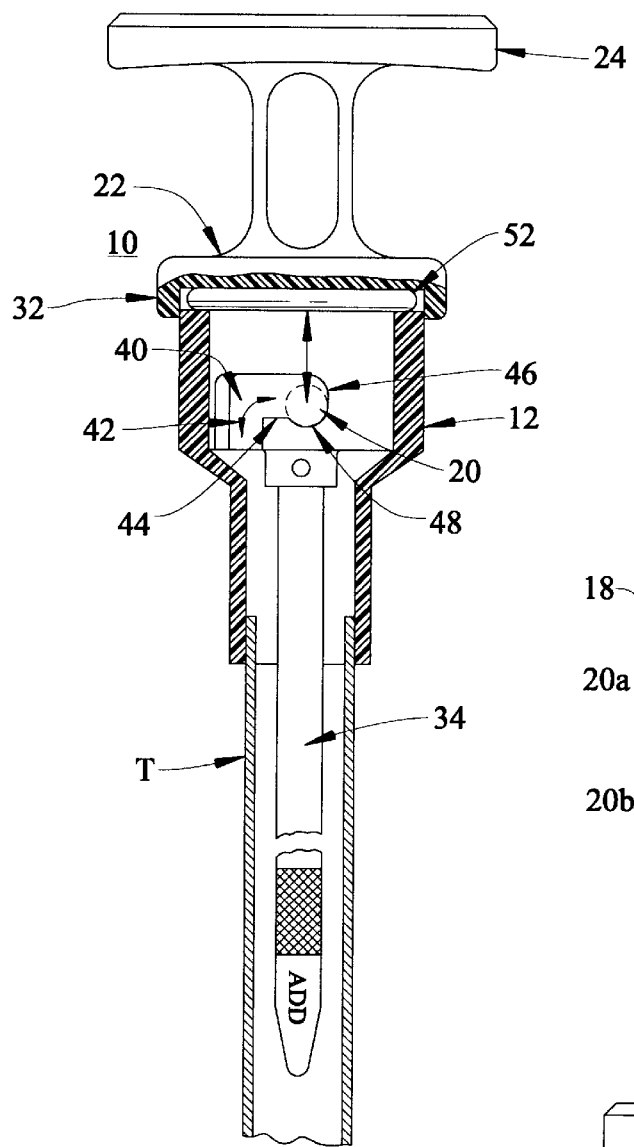
FIG. 1 is an elevation view, partially in cross-section, of an interlocked cap assembly attached to the end of a fill and/or guide tube in accordance with the present invention.

The present invention is a cap assembly having a fixedly attached dipstick which is compatible with both linear and nonlinear fill and/or guide tubes. FIG. 1 shows the fully assembled cap assembly 10 attached to the end of a fill and/or guide tube T. The cap assembly comprises a housing 12, an interlockingly engaging cap 22, and a dipstick 34.

Figure 2A:
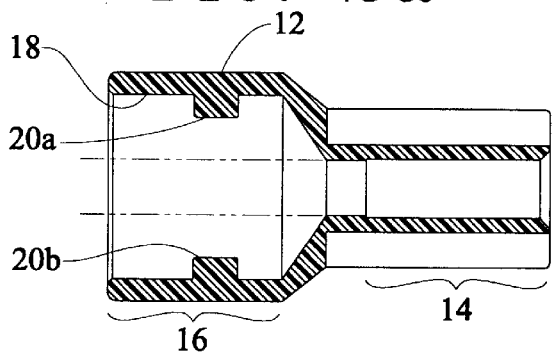
FIG. 2a is a side view in section taken along the line 2a—2a of FIG. 2.

As shown in FIGS. 2 & 2a, the housing 12 is a tubular structure having an opening extending therethrough. Although the housing may be formed from any material suitable for a particular application, the housing is preferably formed from molded plastic. The first connecting end of the housing has a fill and/or guide tube engaging portion 14 with an opening sized to fit over the end of the fill and/or guide tube. The opposing connecting end, as best seen in FIG. 2a, has a cap engaging portion 16 with an inner surface 18 defining an opening for receiving a portion of the cap 22. Preferably, the diameter of the cap engaging portion 16 of the housing, and that of its coterminous portion of the opening, is larger than that of the tube engaging portion 14, and its coterminous portion of the opening. These varying diameters provide the housing with a funnel type configuration which is particularly useful when applied to a fill tube.

Protruding from the inner surface 18 of the housing 12, there are a set of lugs 20(a&b) arranged oppositely and extending radially inward. Preferably, the lugs will be identically sized and shaped. The lugs will preferably be a substantially cylindrical shape and/or have a circular cross-section so that they operate more smoothly to interlock the housing with the cap. The housing may comprise anywhere from one to several lugs radially arranged either symmetrically or asymmetrically about the inner surface 18. The quantity and size of the lugs will be dependent on the particulars of the application. Preferably, the housing and lugs will be integrally formed as a single molded plastic part.

Figure 3:
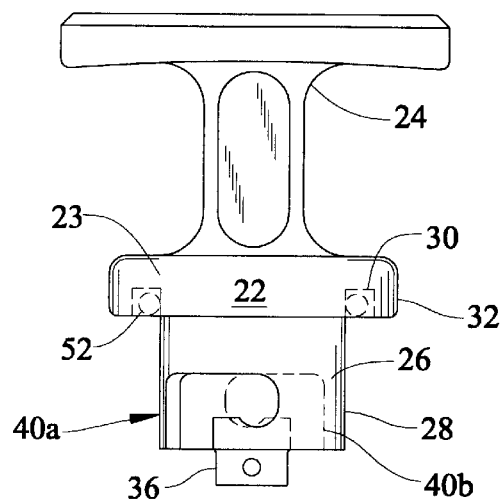
FIG. 3 is a side view of the cap of the cap assembly depicted in FIG. 1.

The cap 22, depicted in FIG. 3, comprises a cap section 23 with a handle 24 attached on one side which can be used to rotate the cap. Extending from the opposite side of the cap section 23, there is a connecting body 26 with an outer surface 28 shaped to fit, preferably snugly, within the cap engaging portion 16 of the housing. Along the outer surface 28, there is a set of grooves 40(a&b) for engaging the lugs 20(a&b). Centrally located on the distal face of the body, there is a boss 36 for attaching the dipstick 34. A shoulder 30 is formed at the junction between the body 26 and the cap section 23 as the cap section extends radially beyond the body. Along the perimeter of the cap section 23 and spaced apart from the body 26, there is a lip 32 extending in that same direction as the body.

Preferably, the cap 22 is formed as an integrally molded plastic part. Although the housing and the cap may each be formed as integrally molded plastic parts from the same type of materials, for instance the same plastic, it will be appreciated that the housing and cap may each be formed from various types of materials and may comprises multiple parts.

A gasket 52, positioned to bear against the shoulder 30 and be compressed between the cap and housing forms a fluid tight seal when the housing and cap are interlocked. The gasket is made from a resilient material. Preferably, the gasket is an O-ring sized to snugly fit around the cap body 26. The gasket is preferably positioned around the body of the cap in the channel defined by the lip 32 and the outer surface of the body 28. Many O-rings are known in the art which are suitable for use with this invention. The composition of the O-ring will be dictated by the design criteria of the particular application. Thus, for example, neoprene O-rings may be suitable when the dipstick is used for oil, while a more chemically resistant O-ring made from plastic coated with Teflon™ or another polyfluoroethylene may be desirable for use with more corrosive fluids.

A dipstick 34, as shown in FIG. 4, is secured within a slot in the boss 36 with a roll pin 38 inserted transversely through the dipstick and the boss. The dipstick 34 may be any elongated member suitable for extending downwardly through and beyond the fill and/or guide tube into a fluid reservoir. Typically, the dipstick will be a flexible blade type formed from materials that are chemically resistant to the fluids in the reservoir and able to withstand the anticipated temperatures. Thus, for example, when the dipstick is used in a motor oil application, the blade will preferably be formed from cold rolled steel. Alternatively, when the dipstick is used to monitor antifreeze levels, the blade may be constructed out of high density polyethylene or some other material resistant to ethylene glycol and other common antifreeze solutions. The blade will typically be provide with indicia for indicating the relative fluid levels. The blade may also have a cross-hatched portion or some other suitable means for retaining fluid in the vicinity of the indicia to assist in ascertaining the fluid level upon visual inspection of the dipstick.

Along the outer surface 28 of the connecting body 26, there is a set of grooves 40(a&b) for engaging and interlocking with the set of lugs 20(a&b) protruding from the inner surface 18 of the housing 12. Typically, the grooves will be identically sized and shaped and will be radially arranged to cooperate with the lugs. The grooves have a first portion 42 that extends from the distal end of the connecting body 26 substantially longitudinally toward the cap section 23. The first portion 42 of the groove connects to a first end of a second portion 44 of the groove to form a substantially continuous guidepath. The second portion 44 extends substantially circumferentially around the connecting body 26. The second portion 44 terminates at a second end opposite the first end to form a stop 46.

A notch 48 proximate with the stop 46 is formed in the side, opposite the cap section 23, of the second portion 44 of the groove. Preferably, one side of the notch will be aligned with the face of the stop 46 to prevent the cap from being rotated within the housing beyond the notch 48. The notch 48 is designed to receive a portion of the lug 20. When the housing and cap are interlockingly engaged, a lug 20 is held stably within the notch 48 due to the force supplied by the compressed gasket 52. The notch is radially positioned about 45° or less from the longitudinal centerline of the first portion 42 of the groove.

FIG. 2 shows a typical non-linear fill and/or guide tube T with which the cap assembly 10 of the present invention is compatible. The tube has a lower end communicating with a fluid reservoir (not shown) and an open upper end on which the housing 12 is positioned. The body of the tube T is bent at an angle. In order to insert a blade-type dipstick 34 into the tube T, the dipstick may need to be rotated so it can bend to assume the shape of the tube. With the dipstick in this inserted position, the housing 12 will preferably be arranged on the tube T so the lugs 20(a&b) align with the first portion 42 of the grooves 40(a&b). More preferably, for assemblies having two lugs spaced 180° apart, the housing will be arranged so the lugs extend perpendicular to plane defined by the non-linear tube and the first portion of the companion grooves will be aligned with the edges of the blade-type dipstick. This enables the housing to be readily mounted in the preferred alignment on the tube by simply studying the contours of the tube T.

To effect a seal on the end of the tube T, the housing is attached to the end of the tube in a fluid tight manner. The dipstick, fixedly attached to the cap, is inserted through the housing and the tube T until the cap engages the housing. The cap is slightly rotated, if necessary, within the housing until the grooves engage the extended lugs. Once the lugs are aligned with the grooves, the cap advances further into the housing until the upper open edge of the housing urges the gasket against the shoulder and the lugs have followed along the first portion of the grooves to a point just before their alignment with the second portion of the grooves. At this point, a pressure sufficient to at least partially compress the gasket and enable the lugs enter the second portion of the groove is applied. Simultaneously, the cap is rotated about 45° or less to a point where the lugs engage the notches. The applied compression pressure is released and the cap is interlocked into the housing with the lugs forcibly held within the notches by the partially compressed gasket. The cap is sufficiently engaged in the housing to maintain a fluid tight seal even in the presence of a positive pressure of up to at least 5 psi within the tube.

While a particular configuration has been depicted and described, the above description is intended to convey an understanding of the present invention. Modifications within the scope of the invention will be obvious to those skilled in the art. Therefore, the scope of the invention should be determined solely by reference to the appended claims.

What is claimed is:

1. A dipstick assembly comprising a dipstick handle, a dipstick body member connected to said handle, and a dipstick blade member connected to said body member and extending away from said handle, and a generally tubular housing for receiving said blade member and at least a portion of said body member;

said housing having an interior wall and an inner diameter, and at least one lug extending into said housing from said interior wall;

said body member being cylindrical and having an outer diameter slightly less than said housing inner diameter, and including at least one slot for receiving said at least one lug, said at least one slot including a first portion generally parallel to said blade member and a second portion generally perpendicular to said to said first portion and having a first end connected to said first portion and a second end separated circumferentially from said first end by less than about 45 degrees, and further including a third portion extending from said second end and angled with respect to said second end.

2. A dipstick assembly according to claim 1 wherein said blade member is fixedly attached to said body member.

3. A dipstick assembly according to claim 1 wherein said third portion extends in a direction away from said dipstick handle.

4. A dipstick assembly according to claim 3 wherein said third portion is generally perpendicular to said second portion.

5. A dipstick assembly according to claim 1 wherein said third portion includes a first end connected to said second portion and a second end terminating in an end wall.

6. A dipstick assembly according to claim 5 wherein said body member includes a resilient sealing portion for forming a seal between said body member and said housing, and wherein said dipstick handle and said housing are separated by a first distance when said sealing portion contacts said housing and said lug is received in said third portion, and by a second distance when said sealing portion contacts said housing and said lug is received in said first portion.

7. A dipstick assembly according to claim 6 wherein said first distance is less than said second distance.

8. A lockable cap assembly comprising a handle, a body member having a cylindrical side wall, and a generally tubular housing having an interior for receiving at least a portion of said body member, wherein said interior includes first connecting means comprising a fixed member projecting into said interior and said body side wall includes second connecting means comprising a slot for receiving said fixed member, said slot having a first end and a second end separated circumferentially from said first end by less than about 45 degrees, and a first portion generally parallel to said side wall, and a second portion generally perpendicular to said first portion for cooperating with said first connecting means to secure said body member to said housing, wherein said second portion of said slot includes a notch for engaging said fixed member.

9. A method for locking a cap onto a housing comprising the steps of:

providing a cap including a body portion having a bottom wall and a cylindrical side wall;

forming a first slot in said side wall extending from and normal to said bottom wall;

forming a second slot in said side wall extending from and normal to said first slot;

providing a cylindrical housing having top opening and a lug extending into said housing proximate to said top opening;

aligning said cap with said housing;

aligning said first slot with said lug;

inserting said body portion into said housing until said lug reaches said second slot; rotating said cap to move said lug along said second slot and away from said first slot; and, forming a third slot in said side wall extending a short distance toward said bottom wall from second slot and rotating said cap to move said lug along said second slot and into said third slot.

\* \* \* \* \*